United States Patent [19]

Shafrir et al.

[11] Patent Number: 4,514,920

[45] Date of Patent: May 7, 1985

[54] DISPLAY MODULE

[76] Inventors: Doron Shafrir, 4 Ross Ave., Spring Valley, N.Y. 10977; Giora Tamir, 26 Lillian St., Pamona, N.Y. 10970

[21] Appl. No.: 442,139

[22] Filed: Nov. 16, 1982

[51] Int. Cl.³ .............................................. G09F 9/00
[52] U.S. Cl. ..................... 40/448; 340/716; 340/784; 350/331 R
[58] Field of Search ............... 40/447, 448; 340/716, 340/763, 784; 350/330, 331 R

[56] References Cited

U.S. PATENT DOCUMENTS

| 3,922,842 | 12/1975 | Fujita | 350/331 R |
|---|---|---|---|
| 4,021,945 | 5/1977 | Sussman | 40/448 |
| 4,026,103 | 5/1977 | Ichikawa et al. | 350/330 |
| 4,184,153 | 1/1980 | Glaubitz | 340/784 |
| 4,189,912 | 2/1980 | Washizuka et al. | 350/331 R |
| 4,227,777 | 10/1980 | Murakami | 350/331 R |
| 4,289,382 | 9/1981 | Clark | 350/331 R |
| 4,359,222 | 11/1982 | Smith et al. | 340/784 |
| 4,371,870 | 2/1983 | Biferno | 340/716 |
| 4,403,830 | 9/1983 | Gerstner | 350/331 R |

FOREIGN PATENT DOCUMENTS

| 2839009 | 3/1979 | Fed. Rep. of Germany | 40/158 R |
|---|---|---|---|
| 2937219 | 3/1981 | Fed. Rep. of Germany | 350/330 |

*Primary Examiner*—Gene Mancene
*Assistant Examiner*—James R. Hakomaki
*Attorney, Agent, or Firm*—Hubbell, Cohen, Stiefel & Gross

[57] ABSTRACT

A display module including a liquid crystal display for displaying corporate logos or other symbols is disclosed. The use of electrodes in the shape of the logo is obviated by using alternative means, such as an image of the logo silk screened on a reflecting member disposed behind the liquid crystal display.

14 Claims, 3 Drawing Figures

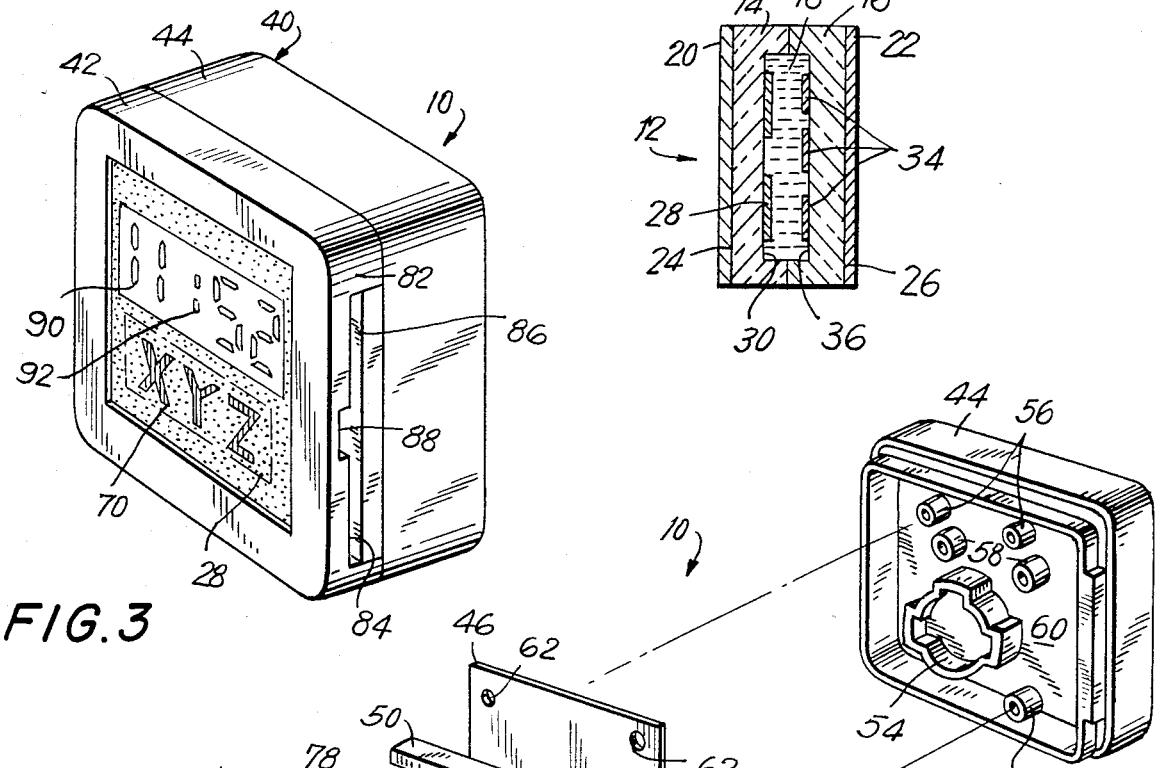
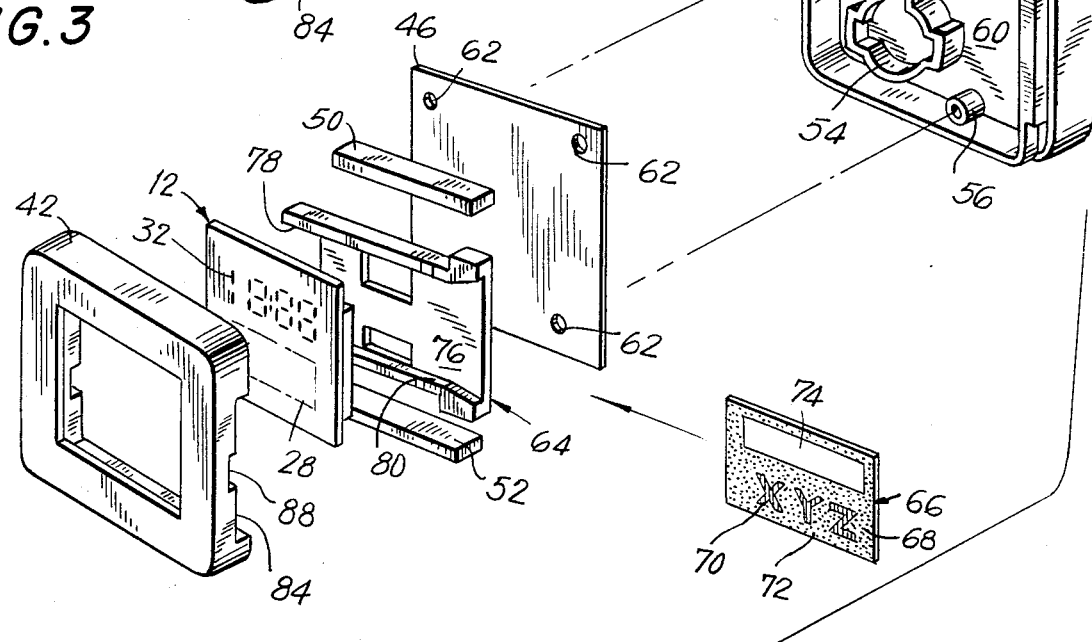

DISPLAY MODULE

TECHNICAL FIELD

This invention relates to liquid crystal displays and more particularly to display modules incorporating liquid crystal displays, for displaying symbols such as corporate logos.

BACKGROUND ART

Commercially available reflective type liquid crystal displays generally comprise top and bottom glass plates and liquid crystal material sandwiched between the plates. A polarizer is placed on the outer surface of each of the glass plates, the polarizers being so oriented that their axes of polarization are orthogonal, and a reflecting surface is placed behind the bottom polarizer. In the absence of an electric field, the liquid crystal material typically serves to rotate by 90° the polarization state of light passing through it with the result that the light is transmitted through the bottom polarizer whereupon it is reflected by the reflecting element back to the observer. When the electric field is applied, the polarization state of the light is unaltered by the liquid crystal material with the consequence that no light passes through the bottom polarizer and hence no light is reflected back to the observer.

In order to display a symbol such as a digit for a clock, transparent planar electrodes are formed on the inner surfaces of the top and bottom plates. Typically, a standard seven segment electrode for each digit is formed on the inner surface of the top plate, and several multiplexed electrodes which collectively overlap the segmented electrodes are formed on the bottom plate.

The correct time is displayed by applying an electric field across selected portions of the liquid crystal material via the appropriate segmented electrodes and multiplexed electrodes. Light passing through those portions of the liquid crystal material under the influence of the electric field is not transmitted by the second polarizer and hence those portions appear dark, while all other areas transmit light to the observer and hence appear bright. A display is thereby effected corresponding in shape to those segmented electrodes to which the electric field is applied, the display appearing dark on a bright background. In the case of a digital time display, a microprocessor controls the application of the electric field to the electrode segments for displaying the correct time.

Commercially available transmissive-type liquid crystal displays operate in a similar manner, the difference typically being that in transmissive-type displays the reflecting element is eliminated, the polarization axes of the polarizers are parallel, and a light source is disposed behind the bottom polarizer. The displayed symbol, which is observed through the top polarizer, appears bright against a dark background.

It will be appreciated that conventional liquid crystal displays require electrodes in the shape of the symbol to be displayed. Consequently, such conventional displays are highly uneconomical where there is a need for only a limited number of displays of a particular symbol. Furthermore, conventional displays offer no possibility of varying the displayed symbol, except in a limited fashion by selective energization of the electrodes, as in the time display discussed above.

It is therefore desirable to provide an alternative display which overcomes the deficiencies of the prior art displays.

DISCLOSURE OF THE INVENTION

The present invention is a display module for displaying symbols such as corporate logos, messages, names, etc., "symbol" being used herein to mean any visually perceptible subject matter. The inventive display module includes a liquid crystal display comprising the usual first and second glass plates, orthogonal polarizers, one on each plate, and liquid crystal material between the plates. In accordance with the invention, the inner surface of each plate has a transparent electrode formed thereon which occupies an area larger than the symbol to be displayed.

The inventive device also includes means, other than electrodes, for depicting the symbol to be displayed. Such means may comprise, for example, a reflecting member having the symbol silk screened thereon, although numerous other means may be employed, some of which will be discussed hereinafter. In accordance with the invention the symbol depicting means is disposed relative to the liquid crystal display such that the symbol lies within the projected area defined by the overlapping portions of the electrodes in the liquid crystal display. For example, in the case of a silk screened reflecting member, the reflecting member may be disposed behind the liquid crystal display such that the symbol is within the above-mentioned projected area.

The symbol is selectively displayed and masked by selectively applying an electric field to the liquid crystal material by applying an electronic signal across the electrodes in a manner well known in the art. For example, when the symbol is silk screened on a reflecting member disposed behind the liquid crystal display, the symbol will be masked whenever an electric field is applied as this will block the transmission of light through the liquid crystal material in front of the symbol. Conversely, when no electric field is applied light will be transmitted through the liquid crystal material and the symbol will be visible.

While it will now be apparent that the symbol is displayed without the need for specially shaped electrodes integrally formed in the liquid crystal display, the displayed symbol nevertheless appears to be part of the liquid crystal display. It will also now be apparent that the display module of the invention may be used to display any symbol without any modification to the liquid crystal display. Only the symbol depicting means, such as the aforementioned silk screened reflecting member, need be changed. Consequently, by employing the display module of the invention, significant economies are achieved when only a limited quantity of display modules for a particular symbol are needed.

It is also an important aspect of the invention that the symbol displayed by the display module may be displayed in color by, for example, silk screening in color onto the reflecting member. Multiple colors are also possible. Indeed, full color pictures may be displayed using the module of the invention.

Further features and advantages of the display module in accordance with the present invention will be more fully apparent from the following detailed description and annexed drawings describing a preferred embodiment and suggesting several modifications thereto.

BRIEF DESCRIPTION OF THE DRAWINGS

In the drawings, wherein like numerals represent like parts:

FIG. 1 is a diagrammatic sectional view showing the liquid crystal display of the inventive display module;

FIG. 2 is an exploded view of a display module constructed in accordance with an illustrative embodiment of the invention; and FIG. 3 is a perspective view of the display module of FIG. 2.

BEST MODE FOR CARRYING OUT THE INVENTION

The display module 10 of the present invention includes a liquid crystal display 12 comprising first and second glass plates 14 and 16 having liquid crystal material 18 therebetween. Polarizers 20 and 22 are disposed on the outer surfaces 24 and 26 of glass plates 14 and 16, respectively, the polarizers 20 and 22 being oriented such that their axes of polarization are orthogonal.

A preferably rectangular transparent electrode 28 is formed on the inner surface 30 of glass plate 14, the area of the electrode 28 being larger than that of the symbol to be displayed. Conventional segmented transparent electrodes 32 for the display of time and date are also formed on the surface 30. Preferably multiplexed transparent electrodes 34 which collectively overlap the electrodes 28 and 32 are formed on the inner surface 36 of the glass plate 16.

In addition to the liquid crystal display 12, display module 10 includes a housing 40 comprising a front section 42 and a rear section 44. The sections 42 and 44 preferably comprise injection molded plastic. Within the housing 40 is a printed circuit board 46 on which a microprocessor (not shown) is mounted. The microprocessor provides electronic signals to the electrodes 28, 32 and 34 for selectively applying an electric field across the liquid crystal material 18 in a known manner.

The circuit board 46 is connected to the liquid crystal display 12 by conventional elastomeric conductors 50 and 52 which are held in place by the housing 40 when the module 10 is assembled. The rear section 44 of the housing 40 includes an integrally formed battery holder 54, the battery, not shown being connected to the circuit board 46 by a conventional conductive element, also not shown. A plurality of standoffs 56, 58 having through bores are integrally formed on the inside back wall 60 of the rear housing section 44. Screws, not shown, extend through standoffs 56 and holes 62 in the circuit board 46, and are received in threaded blind holes formed in standoffs (not shown) integrally formed on the inside front wall of the housing section 42 for holding the module 10 in assembled relation. Conventional push button assemblies (not shown) extend through the standoffs 58 into confronting relation with the circuit board 46. The push buttons are accessible from the back of the unit 10 through the bores in the standoffs 58 and allow adjustment of the time setting and/or date if included.

Also included within the housing 40 is a supporting structure 64 which serves to support a reflecting member 66 behind the liquid crystal display 12. Disposed on the reflecting side 68 of the member 66, preferably by silk screening directly onto the side 68, is the symbol 70 to be displayed in accordance with the invention, shown by way of example in the drawings as the corporate logo "XYZ". For reasons that will be more fully apparent hereinafter, a majority 72 of the reflecting side 68 of the reflecting member 66 is dark, and preferably black, the symbol 70 to be displayed being silk screened in white, or some other contrasting color, directly on the black portion 72. For reasons that will also be apparent hereinafter, a rectangular reflecting area or "window" 74 is formed on the reflecting side 68 of the member 66 above the logo 70.

When the reflecting member 66 is supported by the structure 64, it rests against the back wall 76 of the structure 64 between the top and bottom walls 78, 80 thereof, respectively. In this position, the window 74 overlaps the segmented electrodes 32, and the logo 70 lies within the area of the rectangular electrode 28. As is indicated by the arrow in FIG. 2, the reflecting member 66 is removable from the supporting structure 64.

When the module 10 is assembled, the structure 64 is supported by the housing 40 between the printed circuit board 46 and the liquid crystal display 12. As shown in FIGS. 2 and 3, one side wall 82 of the front housing section 42 is formed with a recess 84 which defines a slot 86 in the housing 40 when the module 10 is assembled. Slot 86 allows the reflecting member 66 to be inserted into and removed from the supporting structure 64 whereby another reflecting member having a different corporate logo or other symbol silk screened thereon may be substituted. Desirably, and as shown in FIGS. 2 and 3, the recess 84 is formed with an indent 88. The indent 88 accommodates insertion of a small screwdriver or the like into the slot 86 when the module 10 is assembled to facilitate removal of the reflecting member 66.

With the module 10 assembled, an electronic signal from the printed circuit board 46 is applied across the appropriate segmented electrodes 32 and the overlapping multiplexed electrodes 34 to effect display of the proper time 90, shown by way of example in FIG. 3 as 11:52. As noted, when the module 10 is assembled the segmented electrodes 32 are within the area defined by the reflecting window 74 formed on the reflecting side 68 of the reflecting member 66. Consequently, when the electronic signal is applied the time display 90 will appear dark against a bright background. If desired, a periodic electronic signal may be applied whereby the time display will "blink" on and off in a known manner. During the periods when no electronic signal is applied to the electrodes 32, 34, the time display will disappear, as all the liquid crystal material overlapping the window 74 will transmit light.

Referring now to the logo 70, and as noted above, when the module 10 is assembled the "XYZ" logo is within the area defined by the rectangular electrode 28. In the absence of an electronic signal applied across the electrode 28 and the overlapping multiplexed electrodes 34, the logo "XYZ" will appear bright against a dark background. On the other hand, when an electronic signal is applied across the electrode 28 and the overlapping multiplexed electrodes 34, light will not be transmitted through the intervening liquid crystal material to the reflecting member 66, and hence the logo will disappear, i.e. the logo portion of the display in FIG. 3 will appear dark. If desired, the same electronic signal used to flash the colon 92 in the time display 90 may also be applied to the electrode 28 and the overlapping multiplexed electrodes 34 whereupon "XYZ" will appear and disappear at the same periodic rate as the colon. Alternatively, an independent signal from the microprocessor may be utilized for selectively displaying the logo 70. In either event, it will be apparent that the display module 10 of the present invention creates the effect that the "XYZ" logo 70 is integrally formed in the liquid crystal display 12 by specially shaped transparent electrodes when in fact this is not the case and the logo is silk screened on a removable reflecting member 66 wholly independent of the liquid crystal display 12.

The display module 10 is advantageous in several important respects. First, a limited number of display modules for displaying a particular symbol may be manufactured at a reasonable cost by virtue of the fact that the basic display module 10 always remains the same, it only being necessary to change the reflecting member 66 to vary the displayed symbol. Another important advantage, and one which has already been noted, is that the corporate logo or other symbol to be displayed is readily displayed in color by simply silk screening in color on the member 66. It will therefore be apparent that the display module 10 in accordance with the invention is a simple yet highly versatile display device capable of displaying any symbol such as a logo, message, etc. while creating the impression that the displayed symbol is incorporated in the liquid crystal displayed when this is not in fact so.

While the foregoing constitutes a description of the preferred display module in accordance with the invention, numerous modifications and variations may be made without departing from the spirit and scope of the invention. For example, while it is presently preferred to silk screen the logo or other symbol to be displayed in a bright color on a dark background, a dark color on a reflecting background may be substituted. When this technique is employed, it is desirable that the reflecting background be limited to a reflecting rectangular area or window similar to the window 74. It has been found that if this additional reflecting window is slightly smaller than the rectangular electrode 28, a particularly pleasing aesthetic effect is created, as the edges of the electrode 28 blend with the background and hence do not stand out. In this regard, the use of dark lettering on a reflective surface is desirable as it has been observed that the displayed symbol stands out more when this technique is used.

If desired, silk screening onto the reflecting member may be replaced with other techniques. For example, in lieu of silk screening, a photographic negative of the logo or other symbol may be affixed or simply placed on the reflecting side 68 of the reflecting member 66, the only requirement being that the logo be disposed within the area of the electrode 28 when the module 10 is assembled. Alternatively, a sticker in the shape of the logo may be employed. The sticker may be affixed to the outer surface of one of the glass plates in the liquid crystal display, on one of the polarizers, or directly on the reflecting side of the reflecting member 66. Silk screening directly onto the outer surfaces of the glass plates in the liquid crystal display or onto the polarizers may also be employed. As yet another alternative, selected areas of one or both of the polarizers may be cut out or treated chemically to effect display of the logo. While some of these alternative techniques do not facilitate substitution of one symbol for another, they all allow more economical production of a limited number of modules for displaying a particular symbol, the symbol in each instance appearing to be formed by transparent electrodes in the liquid crystal display.

Furthermore, while the display module in accordance with the invention preferably comprises a reflective type display, this too is not necessary, and a transmissive type display may be employed. In such event the reflecting member will be eliminated altogether and the symbol may be displayed by using one of the alternative techniques described above.

In the foregoing description, the electrode 34 has been described as a plurality of multiplexed electrodes. Those skilled in the art will now appreciate that the multiplexed electrodes 34 may be utilized to create the effect of movement with respect to the logo 70 or other symbol being displayed. For example, if the electrode 34 comprises three separate multiplexed electrodes, one overlapping the "X", one overlapping the "Y", and one overlapping the "Z" in XYZ, then it will be apparent that each of these letters may be rendered visible sequentially by suitably preprogramming the microprocessor. In this regard, while the electrode 28 has been described as a single rectangular electrode, this is not necessary, and the electrode 28 may also comprise a plurality of multiplexed electrodes which may be used alone or in conjunction with the multiplexed electrodes 34 for providing sequential display effects. Of course, the electrode 34 could be a single electrode, though this is not preferred. Accordingly, throughout this description and claims, the singular term "electrode" should be understood as also including a plurality of electrodes.

Furthermore, while a time and date display is incorporated in the display module 10 shown in FIGS. 1–3, the time and date display may be eliminated. If this is done, it will be apparent that the electrode 28 may be enlarged, whereby the size of the displayed symbol may also be increased. Once this description is known, those skilled in the art will also appreciate that numerous other housings 40 and supporting structures 64 may be devised. For example, the slot 86 in the housing 40 may be eliminated. This may be desirable where it is not intended that the end user vary the displayed symbol, as where the module is distributed as a premium for advertising purposes.

Thus, while we have herein shown and described the preferred embodiment of the present invention and have suggested certain modifications thereto, it will be apparent that yet further changes and modifications may be made without departing from the spirit and scope of the invention. Accordingly, the above description should be construed as illustrative and not in a limiting sense, the scope of the invention being defined by the following claims.

We claim:

1. A display module for displaying a symbol, said display module comprising:

a liquid crystal display including first and second glass plates, a liquid crystal material between said glass plates, first and second polarizers adjacent said first and second glass plates, respectively, and first and scond transparent electrodes on the inner surfaces of said first and second glass plates, respectively;

a source of electricity, and a circuit connected to said source of electricity and said electrodes for applying an electric field across said liquid crystal material;

a housing for supporting said liquid crystal display, said source of electricity, and said circuit in assembled relation;

symbol depicting means having a symbol for display to a viewer; and a supporting structure receivable in said housing for supporting said symbol depicting means behind said liquid crystal display with the symbol within the projected area defined by the overlapping portions of said first and second electrodes, said symbol being selectively displayed and masked by selectively applying said electric field to said liquid crystal material for selectively blocking and unblocking the transmission of light through the area of said liquid crystal display defined by said overlapping electrode portions;

said housing having a slot in a wall thereof in alignment with an edge of said symbol depicting means for accommodating removal of said symbol depicting means from said housing for permitting replacement of said symbol depicting means with a different symbol depicting means having a different symbol.

2. The display module of claim 1, wherein said symbol depicting means comprises a reflecting member having an image of said symbol thereon.

3. The display module of claim 2, wherein said image is silk screened.

4. The display module of claims 1 or 3, wherein said symbol is colored.

5. The display module of claim 1, wherein said depicting means comprises a negative of said symbol.

6. The liquid crystal display of claim 1, wherein at least one of said first and second electrodes comprises a plurality of multiplexed electrodes.

7. The liquid crystal display of claim 1, wherein said symbol depicting means comprises a reflecting member and another member having said symbol thereon disposed between said liquid crystal display and said reflecting member.

8. The liquid crystal display of claim 1, wherein said first electrode is rectangular.

9. The liquid crystal display of claim 3, wherein said symbol is within a reflecting area on a surface of said reflecting member, the portion of said reflecting member surrounding said area being darkened.

10. The liquid crystal display of claim 9, wherein said first electrode is rectangular, and wherein said reflecting area is also rectangular and alignable within the projected area of said first electrode.

11. The liquid crystal display of claim 10, wherein at least one of said first and second electrodes comprises a plurality of multiplexed electrodes.

12. The liquid crystal display of claim 11, wherein said symbol comprises a plurality of elements, and wherein said said elements are displayed at different times.

13. The liquid crystal display of claim 1, and further comprising transparent segmented electrodes disposed on the inner surface of said first glass plate for displaying images such as time or date, in addition to said symbol, said segmented electrodes being overlapped by said second electrode.

14. The liquid crystal display of claim 11, and further comprising transparent segmented electrodes disposed on the inner surface of said first glass plate for displaying images such as time or date, in addition to said symbol, said segmented electrodes being overlapped by said second electrode.

* * * * *